United States Patent [19]
Kawamoto et al.

[11] Patent Number: 6,084,384
[45] Date of Patent: Jul. 4, 2000

[54] POWER SUPPLY CIRCUIT WITH AUXILIARY CONSTANT VOLTAGE CIRCUIT INHIBIT FEATURE

[75] Inventors: Satoru Kawamoto, Chita-gun; Tsukasa Kaneko, Toyohashi; Yasumitsu Tanaka, Nakashima-gun, all of Japan

[73] Assignee: Denso Corporation, Kariya, Japan

[21] Appl. No.: 09/260,130

[22] Filed: Mar. 1, 1999

[30] Foreign Application Priority Data

Mar. 17, 1998 [JP] Japan .................................. 10-067057

[51] Int. Cl.⁷ ................................. G05F 1/56; H02G 3/00
[52] U.S. Cl. .......................................... 323/269; 307/10.7
[58] Field of Search ..................................... 323/272, 273,
323/268, 269; 307/44, 86, 130, 125, 64,
65, 66

[56] References Cited

U.S. PATENT DOCUMENTS 5,375,247 12/1994 Hueser .

FOREIGN PATENT DOCUMENTS

Y2-3-33566 11/1982 Japan .
57-208825 12/1982 Japan .

*Primary Examiner*—Peter S. Wong
*Assistant Examiner*—Rajnikant B. Patel
*Attorney, Agent, or Firm*—Nixon & Vanderhye P.C.

[57] ABSTRACT

A compact power supply circuit which can supply power to various apparatuses and circuits with a high degree of stability. A primary constant voltage circuit is connected to a second power supply line, which is supplied with power from a battery only when a relay is closed. The circuit supplies power to a third power supply line at a constant primary voltage. An auxiliary constant voltage circuit is connected to a first power supply line, which is always supplied with power from the battery for supplying power to the third power supply line at a constant auxiliary voltage lower than the primary voltage. A halt control circuit enables the operation of the auxiliary constant voltage circuit if power is supplied to the second power supply line and disables the operation of the auxiliary constant voltage circuit if the supply of power is interrupted for a period equal to or longer than a predetermined allowable time. The supply of power to the third power supply line is continued by the auxiliary constant voltage circuit if the temporary interruption of the supply of power to the second power supply line is within the allowable time.

30 Claims, 6 Drawing Sheets

POWER SUPPLY CIRCUIT WITH AUXILIARY CONSTANT VOLTAGE CIRCUIT INHIBIT FEATURE

CROSS-REFERENCE TO RELATED APPLICATION

The present invention is related to, and claims priority from, Japanese patent application No. Hei. 10-67057, filed Mar. 17, 1998, the contents of which are incorporated herein by reference.

BACKGROUND OF THE INVENTION

1. Field of the Invention

The present invention relates to power supply circuits, and particularly to a circuit including a first power supply line continuously supplied with power and a second power supply line supplied with power only when a switch between a power supply and itself is closed.

2. Related Art

Power supply circuits that are associated with electronic control units (ECUs) for performing various types of control functions, such as vehicle engine control, are well known. Specifically, as shown in FIG. 6, such a power supply circuit 100 includes a first power supply line BATT connected to a power supply terminal T1. The terminal T1 in turn is connected to a battery power supply BT through an ECU connector C, and is continuously supplied with power from the battery BT. Further, a second power supply line +B is connected to a power supply terminal T2 and a ground line G connected to ground terminals T3, T4. The second power supply line +B is supplied with power only when the contact of a relay RLY provided between the battery BT and the terminal T2 is closed. The relay RLY is configured such that the contact is opened and closed in accordance with the operation of an ignition switch IG.

The first power supply line BATT is used to supply power to apparatuses and circuits which require a continuous source of power regardless of the operation of the ignition switch IG, whereas the second power supply line +B is used to supply power to apparatuses and circuits which are activated in response to an ON state of the ignition switch IG.

In the power supply circuit 100, constant voltage circuits 10, 20 are connected to the first power supply line BATT and the second power supply line +B, respectively. The constant voltage circuit 10 connected to the first power supply line BATT is formed by a resistor 12 connected to the first power supply line BATT at one end and to an output terminal of the constant voltage circuit 10 at the other end, and a Zener diode 14 connected to the circuit output terminal at the cathode and to the ground line G at the anode. The output of the constant voltage circuit 10 is normally used as a back-up power supply for maintaining the contents of a data storage circuit such as a RAM and, therefore, the voltage output by the circuit must only be within a predetermined allowable range required for the RAM or the like to normally operate.

The constant voltage circuit 20 connected to the second power supply line +B comprises a PNP type power transistor 22 connected to the second power supply line +B at the emitter and to an output terminal of the constant voltage circuit 20 at the collector, and a well-known constant voltage control IC (e.g., TA7900 manufactured by TOSHIBA) 24. The IC includes an enable terminal e connected to the second power supply line +B, a reference power supply terminal f connected to the first power supply line BATT, a monitor terminal m connected to the collector of the transistor 22, and a control terminal b connected to the base of the transistor 22. The IC operates when a voltage applied to the enable terminal e is equal or greater than a preset operational threshold (4 V) to control the base current of the transistor 22 through the control terminal b such that a voltage applied to the monitor terminal m (that is, the output voltage of the constant voltage circuit 20) becomes constant (e.g., 5.0 V), and is configured such that the output voltage of the constant voltage circuit 20 can be kept constant with a high degree of accuracy to enable circuits in microcomputers and the like to be accurately controlled.

The constant voltage control IC 24 incorporates a reference voltage generation circuit which utilizes a band gap of a semiconductor to generate a reference voltage having substantially no temperature-related fluctuation in order to generate the required constant voltage with a high degree of accuracy. The IC is supplied with power through the reference power supply terminal f to operate the reference voltage generation circuit. The reference power supply terminal f is connected to the first power supply line BATT to enable the reference voltage to be established at the reference voltage generation circuit when the relay RLY is closed. As a result, the constant voltage control IC 24 can perform accurate control.

The power supply circuit 100 further includes a diode 4 connected between the first and second power supply lines BATT, +B whose forward direction is the direction in which a current flows from the second power supply line +B to the first power supply line BATT, and a capacitor 6 connected between the second power supply line +B and the ground line G.

Countermeasures exist to prevent instantaneous interruption on the first and second power supply lines BATT, +B caused by poor contact at connector terminals T1–T4, chattering at the relay contact and the like attributable to vehicle vibration during the operation of the engine and the like. For example, when the supply of power from the battery BT to the first power supply line BATT is interrupted, the supply of power to the first power supply line BATT is maintained with power supplied from the second power supply line +B through the diode 4. When the supply of power from the battery BT to the power supply line +B is interrupted, the capacitor 6 is discharged to continue to provide power to the second power supply line +B. The connector terminals T3, T4 are duplicated to cope with such instantaneous interruption of the ground line G.

In order to improve the kinetic and exhaust gas cleaning performance of vehicles, an increased number of apparatuses and circuits are being connected to vehicle ECUs. Normally, power must be supplied to such apparatuses and circuits through an additional output of the constant voltage circuit 20 via a third power supply line DL that exhibits a stable voltage. However, the need for such an additional circuit increases the amount of power supplied through the second power supply line +B which supplies power to the constant voltage circuit 20.

When the amount of power supplied through the second power supply line +B is increased, a capacitor having a larger capacity is also required to cope with instantaneous interruption as described above. However, the larger capacitor increases the size of the power supply circuit.

In addition, an aluminum electrolytic capacitor commonly used as a high capacity capacitor is subjected to significant changes in its characteristics related to temperature in a high temperature automotive environment, and its capacity is gradually reduced. As a result, the reliability of the power supply circuit is compromised in its operation in, for example, reducing the duration of instantaneous power line interruption that can be coped with, as well as reducing the operational life of the circuit.

Further, while poor contact at the connector terminals may be overcome by duplicating the connector terminals T1, T2 in a manner similar to the ground line G, the size of the connector is increased as are the number of wire harnesses. As a result, the size of the apparatus and the complexity of the associated wiring are increased.

SUMMARY OF THE INVENTION

It is an object of the present invention to provide a compact power supply circuit which can supply power to various apparatuses and circuits in a highly stable and accurate manner.

In particular, the power supply circuit of the present invention includes a first power supply line continuously supplied with power, and a second power supply line which is supplied with power only when a supply line switch is closed. A primary constant voltage circuit is connected to the second power supply line and supplies power to a third power supply line at a preset constant primary voltage. An auxiliary constant voltage circuit connected to the first power supply line supplies power to the third power supply line at a constant auxiliary voltage which is set lower than the primary voltage.

When the supply line switch is closed and both the primary and auxiliary constant voltage circuits are in operation, power is normally supplied to the third power supply line from the higher voltage primary constant voltage circuit. However, when the supply of power to the second power supply line is interrupted and the output voltage of the primary constant voltage circuit becomes less than the output voltage of the auxiliary constant voltage circuit, the auxiliary constant voltage circuit supplies power in place of the primary constant voltage circuit.

A halt controller halts the operation of the auxiliary constant voltage circuit when the supply of power from the power supply to the second power supply line has been interrupted for a period equal to or longer than a preset allowable time. Therefore, even if the supply of power to the second power supply line is temporarily interrupted within an allowable time due to instantaneous interruption caused by chattering of the supply line switch, the supply of power to the third power supply line can be continued in a stable manner. This is because the auxiliary constant voltage supply supplies power to a third power supply line through the first power supply line until the supply of power to the second power supply line is resumed.

When the supply of power to the second power supply line is thus interrupted, power is supplied to the third power supply line through the first power supply line, and there is no need for providing a capacitor having an increased capacity, or for duplicating the connector terminals for the second power supply line as in conventional apparatuses.

Further, there is no wasteful power consumption through the auxiliary constant voltage circuit in the power supply circuit of the present invention when power no longer needs to be supplied to the third power supply, as the operation of the auxiliary constant voltage circuit is also halted to stop the supply of power to the third power supply line after the allowable time has expired.

DETAILED DESCRIPTION OF THE PRESENT INVENTION

Figure 1:
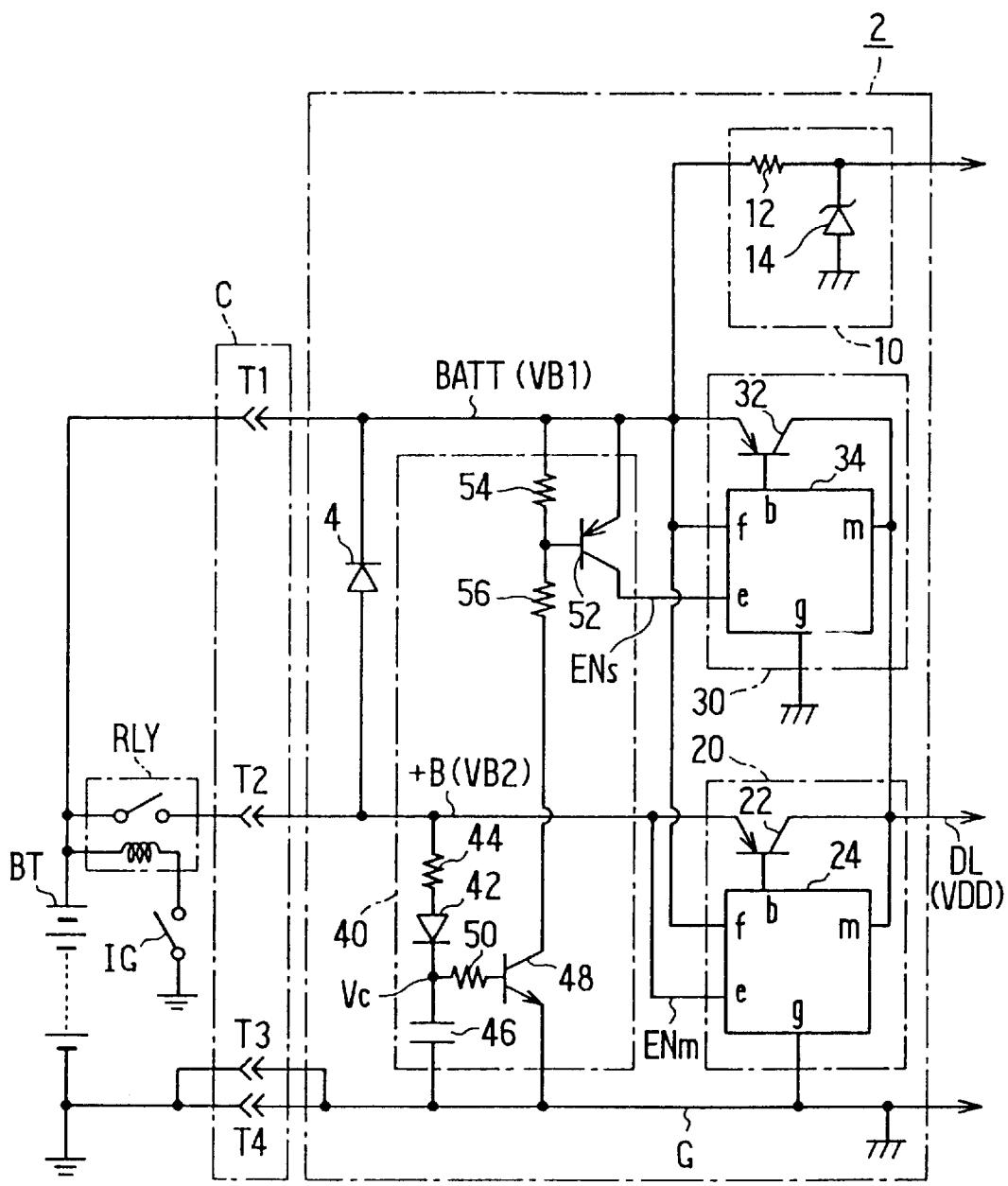
FIG. 1 is a circuit diagram showing a configuration of a power supply circuit according to a first embodiment of the present invention.

Embodiments of the present invention will now be described with reference to the drawings. FIG. 1 is a circuit diagram showing configurations of a power supply circuit 2 according to a first embodiment of the present invention, as well as various circuits positioned around the power supply circuit. The following description will focus only on parts of the circuit that patentably differ from the previously-described conventional circuit, with like parts being referenced by like reference numbers and further description thereof being omitted.

Specifically, the power supply circuit 2 of the present embodiment includes a first power supply line BATT connected to a power supply terminal Ti of a connector C, a second power supply line +B connected to a power supply terminal T2, and a ground line G connected to ground terminals T3 and T4. Further, the circuit includes a constant voltage circuit 10 connected to the first power supply line BATT, a constant voltage circuit 20 connected to the second power supply line +B and a diode 4 connected between the first and second power supply lines BATT, +B.

Figure 6:
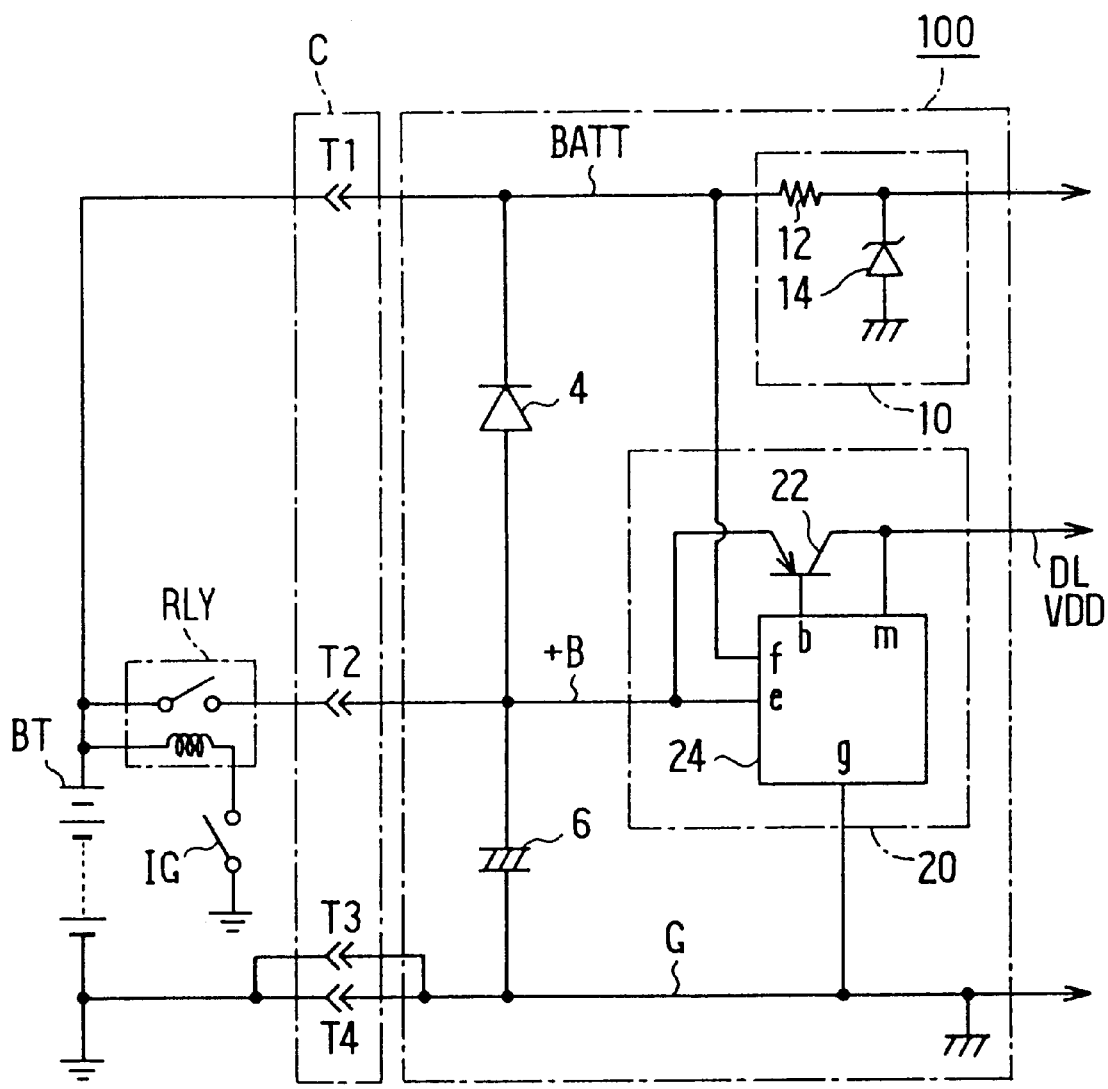
FIG. 6 is a circuit diagram showing a configuration of a prior art power supply circuit.

In the power supply circuit 2 of the present embodiment, an auxiliary constant voltage circuit 30 having the same configuration as the primary constant voltage circuit 20 is connected to the second power supply line +B. The auxiliary constant voltage circuit 30 is also connected to the first power supply line BATT. In addition, a halt control circuit 40 is provided in place of the capacitor of FIG. 6.

A transistor 32 forming a part of the auxiliary constant voltage circuit 30 is connected to the first power supply line BATT at the emitter and to a third power supply line DL at the collector. A constant voltage control IC 34 is connected to the base of the transistor 32 at a control terminal b, to the collector of the transistor 32 at a monitor terminal m, to the first power supply line BATT at a reference power supply terminal f, and to the halt control circuit 40 at an enable terminal e. Further, the constant voltage control IC 34 is set such that it controls the voltage of the third power supply line DL to a constant value (e.g., 4.9 V) slightly lower than that of the constant voltage control IC 24 of the primary constant voltage circuit 20.

The halt control circuit 40 includes a diode 42, and a resistor 44 connected between the second power supply line +B and the anode of the diode 42. In addition, a capacitor 46 is connected between the cathode of the diode 42 and the ground line G. The circuit also includes an NPN type transistor 48 whose emitter is connected to the ground line G, and a resistor 50 connected between the cathode of the diode 42 and the base of the transistor 48.

The halt control circuit 40 also includes a PNP type transistor 52 connected to the first power supply line BATT at the emitter and to the enable terminal e of the constant voltage control IC 34 at the collector. A resistor 54 is connected between the first power supply line BATT and the base of the transistor 52, while a resistor 56 is connected between the base of the transistor 52 and the collector of the transistor 48.

During operation of the halt control circuit 40, when the second power supply line +B is supplied with power from the battery BT, the capacitor 46 is charged through the resistor 44 and diode 42, and the transistor 48 is turned on as the charging voltage reach an ON voltage charging (approximately equal to 0.7 V). A steady state charging voltage VCmax in which the capacitor 46 is fully charged can be expressed by Equation (1) below.

$$VCmax = (VB1 - Vf - Vbe) \cdot R2/(R1+R2) + Vbe \qquad (1)$$

where R1 and R2 represent the resistance of the resistors 44, 50: Vf represents a forward voltage drop at the diode 42: and VB represents the voltage at the second power supply line +B.

When the transistor 48 is on, the transistor 52 is also turned on because a current flows through the resistors 54, 56 to apply a bias voltage across the base and emitter of the transistor 52. The bias voltage consequently causes an enable signal $EN_s$ at a high level to be applied to the enable terminal e of the constant voltage control IC 34.

When the supply of power from the battery BT to the second power supply line +B is interrupted, the charge in the capacitor 46 is gradually discharged through the resistor 50 and transistor 48. Also, the transistor 48 is turned off when the charging voltage VC of the capacitor 46 falls below the ON voltage Vbe of the transistor 48.

When the transistor 48 is off, the transistor 52 is also turned off, as no current flows through the resistors 54, 56 to make the potential of the base of the transistor 52 equal to the potential at the first power supply line BATT or the potential at the emitter of the transistor 52. Consequently, a low-level enable signal $EN_s$ is input to the enable terminal e of the constant voltage control IC 34.

Because the discharge of the capacitor 46 occurs at a rate that depends on an RC time constant determined by the capacity of the capacitor 46 and the resistance of the resistor 50, the duration of an allowable time Td during which the enable signal $EN_s$ is maintained at the high level after the supply of power to the second power supply line +B is interrupted is determined by the setting of this time constant.

The general operation of the power supply circuit 2 of the present embodiment will now be described with reference to FIG. 2, which shows a waveform at each part of the power supply circuit 2.

Figure 2:
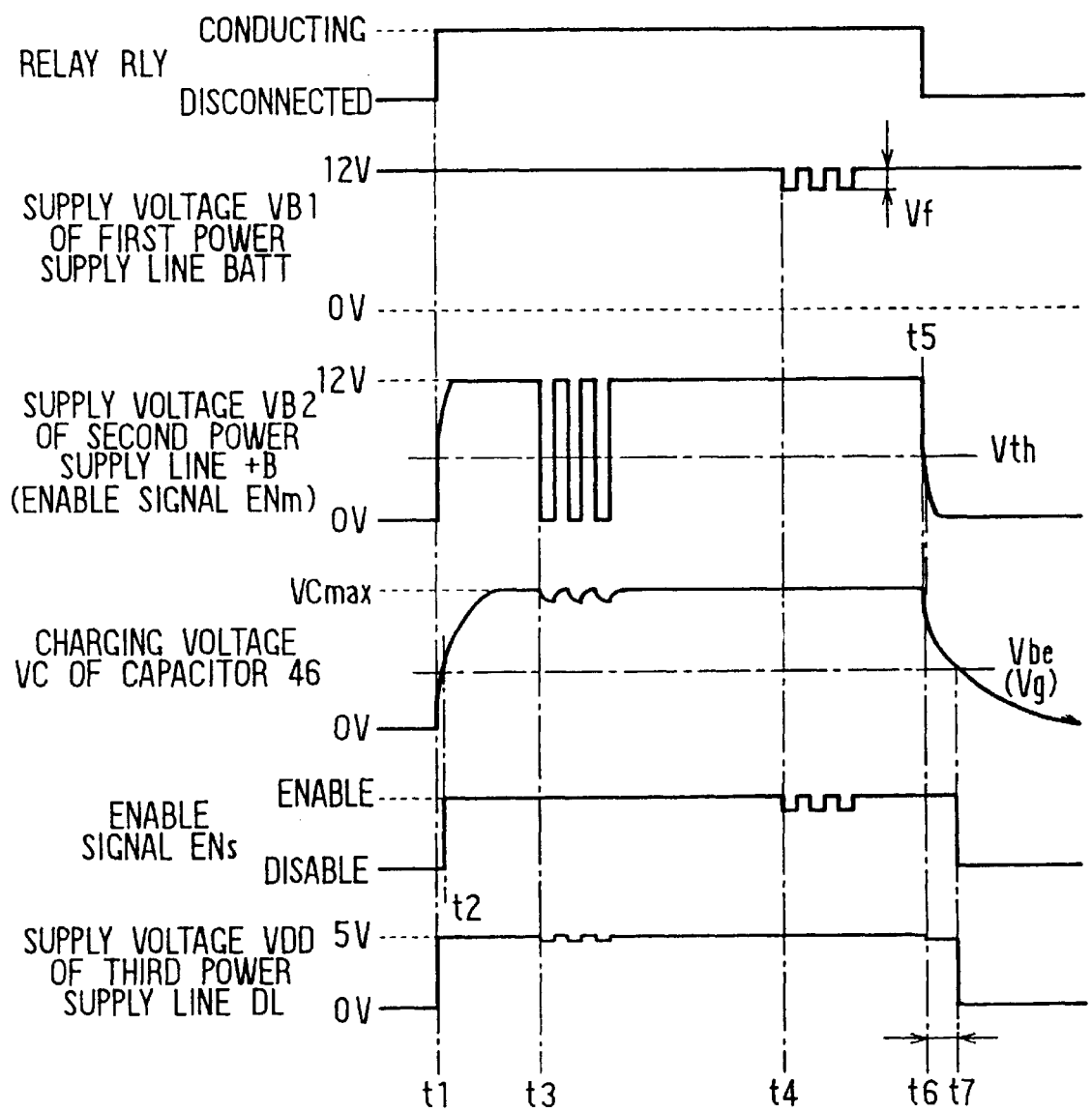
FIG. 2 is a waveform diagram showing the operation of each part of the power supply circuit shown in FIG. 1.

As shown in FIG. 2, before a point in time t1 at which the relay RLY is in a disconnected state, the voltage at the second power supply line +B is 0 V, and only the first power supply line BATT is supplied with power from the battery BT. At this time, both the primary constant voltage circuit 20 for which the voltage at the second power supply line +B serves as an enable signal ENm and the auxiliary constant voltage circuit 30 are halted, because the capacitor 46 has not been charged and the enable signal $EN_s$ output by the halt control circuit 40 is at a low disable level. Therefore, no power is supplied to the third power supply line DL.

When the ignition switch IG is operated to put the relay RLY in a conducting state (t1), the supply of power from the battery BT to the second power supply line +B is started to increase a supply voltage VB2 to the second power supply line +B. When this supply voltage VB2 exceeds an operational threshold Vth at the enable terminal e of the constant voltage control IC 24, the primary constant voltage circuit 20 starts to supply power to the third power supply line DL.

At the halt control circuit 40, the charging voltage VC of the capacitor 46 gradually increases, and the enable signal $EN_s$ reaches an enable level when it exceeds the ON voltage Vbe of the transistor 48 at time t2 to enable the auxiliary constant voltage circuit 30.

Thereafter, an instantaneous interruption at time t3 occurs at the second power supply line +B due to causes such as chattering at the relay contact or poor contact at the connector terminal T2. As a result, the operation of the primary constant voltage circuit 20 is halted and its output voltage is less than the output voltage of the auxiliary constant voltage circuit 30 while the supply of power from the battery BT is interrupted. Consequently, the auxiliary constant voltage circuit 30 supplies power to the third power supply line DL.

While the supply of power from the battery BT to the second power supply line +B is interrupted, the charging voltage VC of the capacitor 46 is reduced because it is discharged. In this case, since the time of instantaneous interruption is sufficiently shorter than the allowable time Td required for discharging from the voltage at the full charge VCmax to the ON voltage Vbe, the enable signal $EN_s$ is maintained at a high level.

When the supply of power from the battery BT to the second power supply line +B is recovered, the primary constant voltage circuit 20 resumes its supply of power to the third power supply line DL. Therefore, in case of such instantaneous interruption of the second power supply line +B, a supply voltage VDD to the third power supply line DL fluctuates slightly depending on the difference between the output voltages of the primary constant voltage circuit 20 and auxiliary constant voltage circuit 30, whereas the supply of power to the third power supply line DL is continued in a stable manner.

When instantaneous interruption occurs at the first power supply line BATT (t4), the supply voltage VB1 of the first power supply line BATT decreases in an amount corresponding to a forward voltage drop vf at the diode 4 while the supply of power from the battery BT is interrupted, as power is supplied to the second power supply line +B through the diode 4. At this time, although the enable signal $EN_s$ fluctuates accordingly, no operational problems occur if the voltage difference between the enable level of the enable signal $EN_s$ and the operational threshold is kept sufficiently greater than the forward voltage drop vf at the diode 4.

When the ignition switch IG is operated thereafter to disconnect the relay RLY (t5), the supply voltage to the second power supply line +B rapidly drops and the operation of the primary constant voltage circuit 20 is halted as it falls below the operational threshold Vth of the constant voltage control IC 24 (t6). Therefore, the auxiliary constant voltage circuit 30 continues to supply power to the third power supply line DL. When the discharge of the capacitor 46 proceeds to reach the ON voltage Vbe (t7), i.e., when the allowable time Td passes after the operation of the primary constant voltage circuit 20 is halted, the enable signal $EN_s$ output by the halt control circuit 40 reaches a DISABLE level to halt the operation of the auxiliary constant voltage circuit 30, thereby stopping the supply of power to the third power supply line DL.

As described above, when the supply of power from the battery BT to the second power supply line +B is interrupted to halt the operation of the primary constant voltage circuit 20, power is supplied to the third power supply line DL from the auxiliary constant voltage circuit 30 connected to the first power supply line BATT only during the allowable time Td.

Therefore, in the power supply circuit 2 of the present embodiment, the supply of power to the third power supply line DL can be continued in a stable manner even if there an instantaneous interruption occurs at the second power supply line +B. Further, the supply of power to the third power supply line DL can be reliably stopped when the relay RLY is kept in a disconnected state.

As such countermeasures against instantaneous interruption are taken without the need for a high-capacity capacitor 6 as in the above-described conventional power supply circuit 100 and without the need to increase the number of terminals of the connector C, an ECU incorporating the power supply circuit 2 of the present invention can be made compact.

Further, the halt control circuit 40 can be incorporated in the constant voltage control ICs 24, 34 because it is easy to configure as an integrated circuit. Because the halt control circuit 40 and the constant voltage control ICs 24, 34 can be configured as a single IC, the size of the power supply circuit 2, and thus the size of the ECU, is reduced.

In addition, the output voltage of the auxiliary constant voltage circuit 30 is set lower than the output voltage of the primary constant voltage circuit 20, and no current is applied to the auxiliary constant voltage circuit 30 when the primary constant voltage circuit 20 supplies power to the third power supply line DL. Therefore, there is no wasteful consumption of power at the auxiliary constant voltage circuit 30.

Furthermore, the power supply circuit 2 of the present embodiment does not require a capacitor with a great capacity, and hence does not require an aluminum electrolytic capacitor susceptible to damage in a high temperature environment. Therefore, the circuit can be utilized as an ECU power supply circuit in a high temperature environment such as in proximity to a motor vehicle engine.

Figure 3:
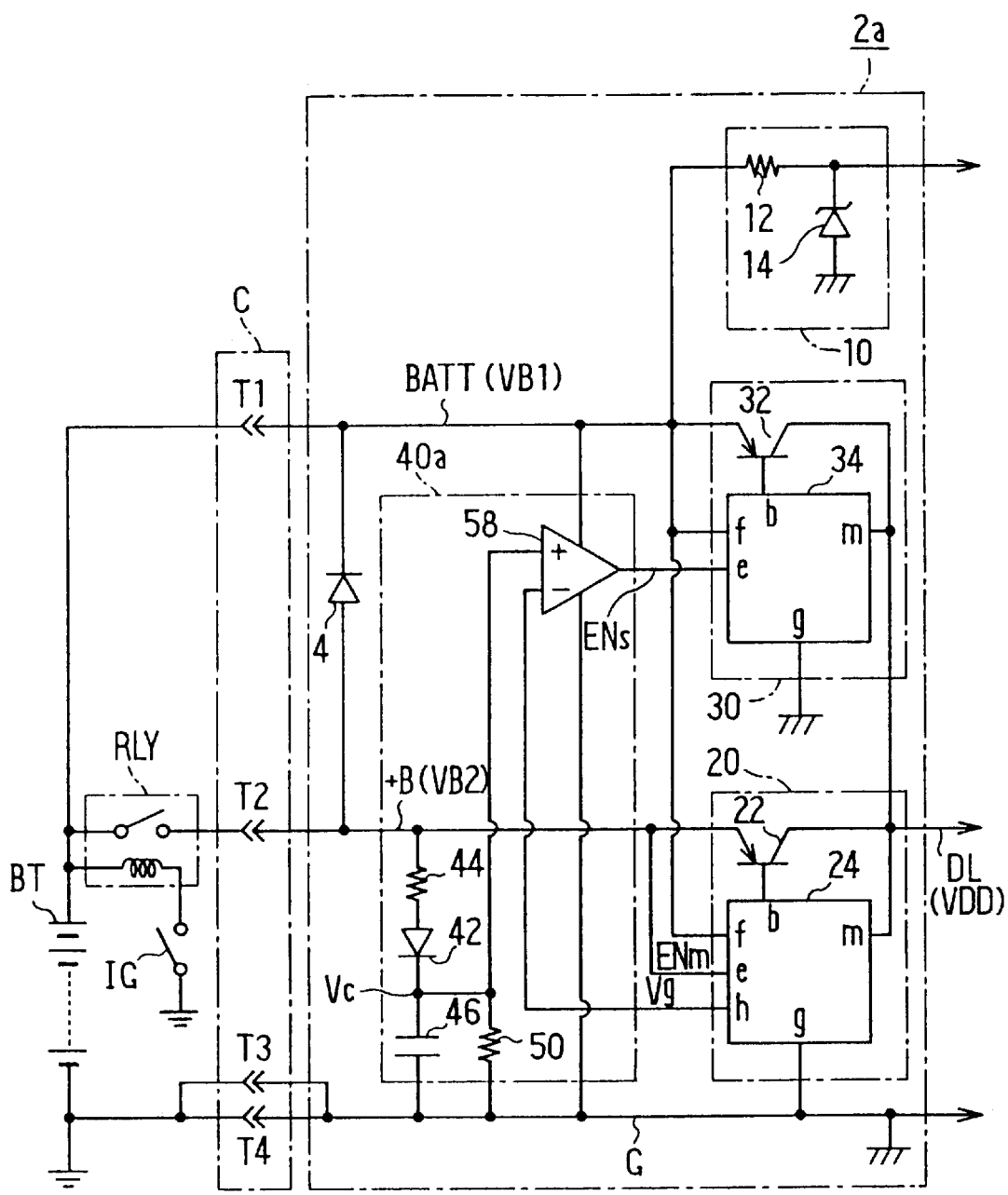
FIG. 3 is a circuit diagram showing a configuration of a power supply circuit according to a second embodiment of the present invention.

Turning to FIG. 3, a power supply circuit 2a according to a second embodiment of the present invention will now be described. Since the power supply circuit 2a of the present embodiment differs from that of the first embodiment only in the halt control circuit, the description will be focused on only that area.

Specifically, in the power supply circuit 2a of the present embodiment, as shown in FIG. 3, a halt control circuit 40a includes a resistor 44, a diode 42 and a capacitor 46 connected in series as in the first embodiment, and a resistor 50 connected to the capacitor 46 in parallel.

The halt control circuit 40a also includes a comparator 58 for generating an enable signal $EN_S$. The comparator 58 operates on power supplied by a first power supply line BATT, and is connected to the cathode of the diode 42 at the non-inverted input and to a reference voltage output terminal h of a constant voltage control IC 24 forming a part of a primary constant voltage circuit 20 at the inverted input.

The reference voltage output terminal h is a terminal for taking out a reference voltage Vg generated based on the band gap of a semiconductor in the constant voltage control IC 24.

In the halt control circuit 40a, when the second power supply line +B is supplied with power from the battery BT, the capacitor 46 is charged through the resistor 44 and the diode 42. When a charge voltage VC thereof exceeds the reference voltage Vg, the enable signal $EN_S$ generated by the comparator 58 reaches an ENABLE level.

In the present embodiment, a charge voltage VCmax in a steady state in which the capacitor 46 is fully charged is expressed by Equation (2) below.

$$VCmax = (VB1 - Vf)R2/(R1+R2) \quad (2)$$

where VB1, Vf, R1 and R2 are the same as those in the first embodiment.

When the supply of power from the battery BT to the second power supply line +B is interrupted, the capacitor 46 is gradually discharged through the resistor 50. When the charge voltage VC of the capacitor 46 falls below the reference voltage Vg, the enable signal $EN_S$ generated by the comparator 58 reaches a disable level.

That is, the power supply circuit 2a having such a halt control circuit 40a operates as does the power supply circuit 2 in the first embodiment, except that the reference voltage Vg is used instead of the ON voltage Vbe as a threshold for generating the enable signal $EN_S$. The power supply circuit 2a of the present embodiment can provide the same effects as those of the power supply circuit 2 of the first embodiment.

In the power supply circuit 2a of the present embodiment, the reference voltage Vg, which is free from temperature-related voltage fluctuation, is used as a threshold for generating the enable signal $EN_S$. Therefore, it is possible to provide a more stable duration of allowable time Td during which the auxiliary constant voltage circuit 30 is allowed to operate after the primary constant voltage circuit 20 is halted.

Figure 4:
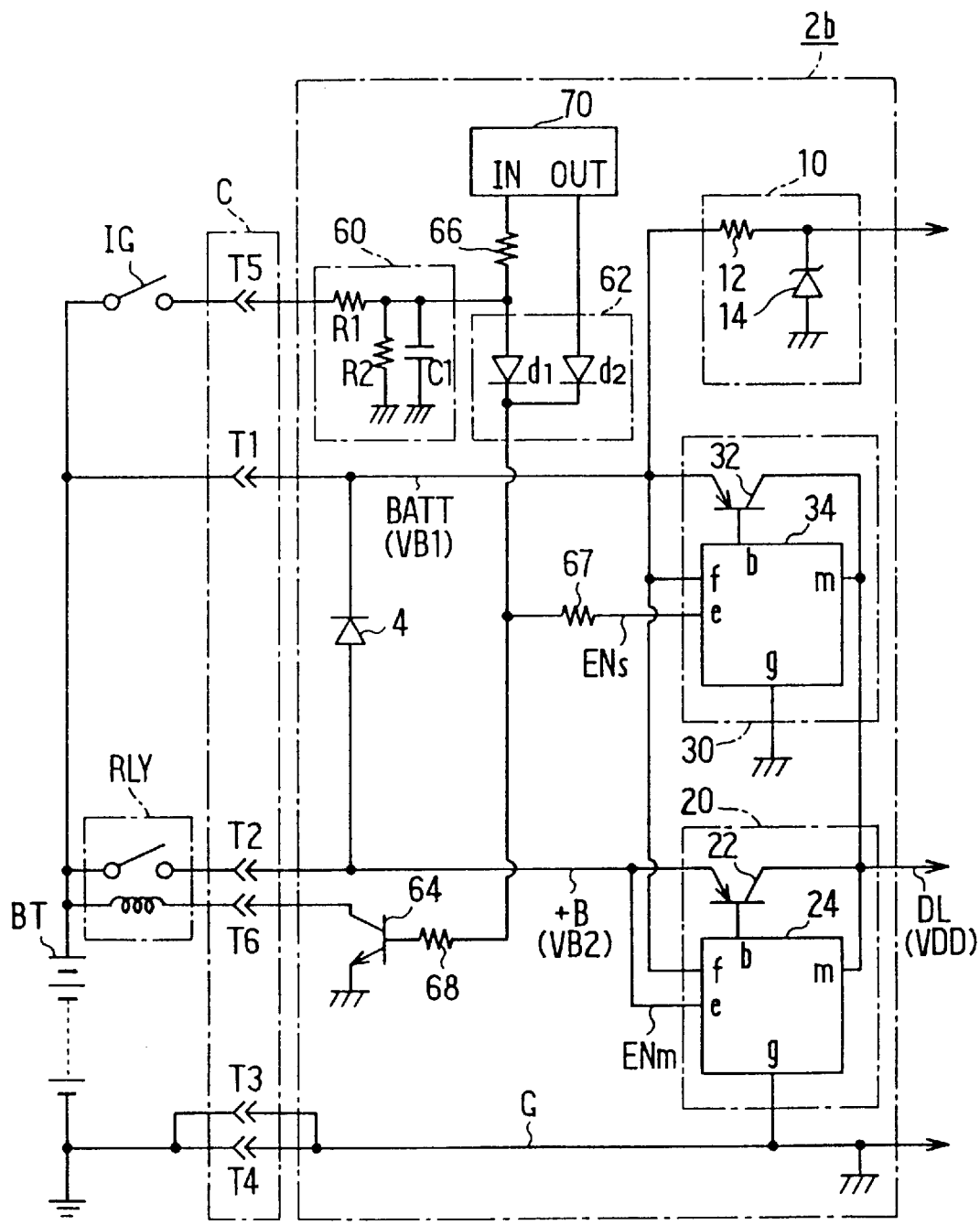
FIG. 4 is a circuit diagram showing a configuration of a power supply circuit according to a third embodiment of the present invention.
Figure 5:
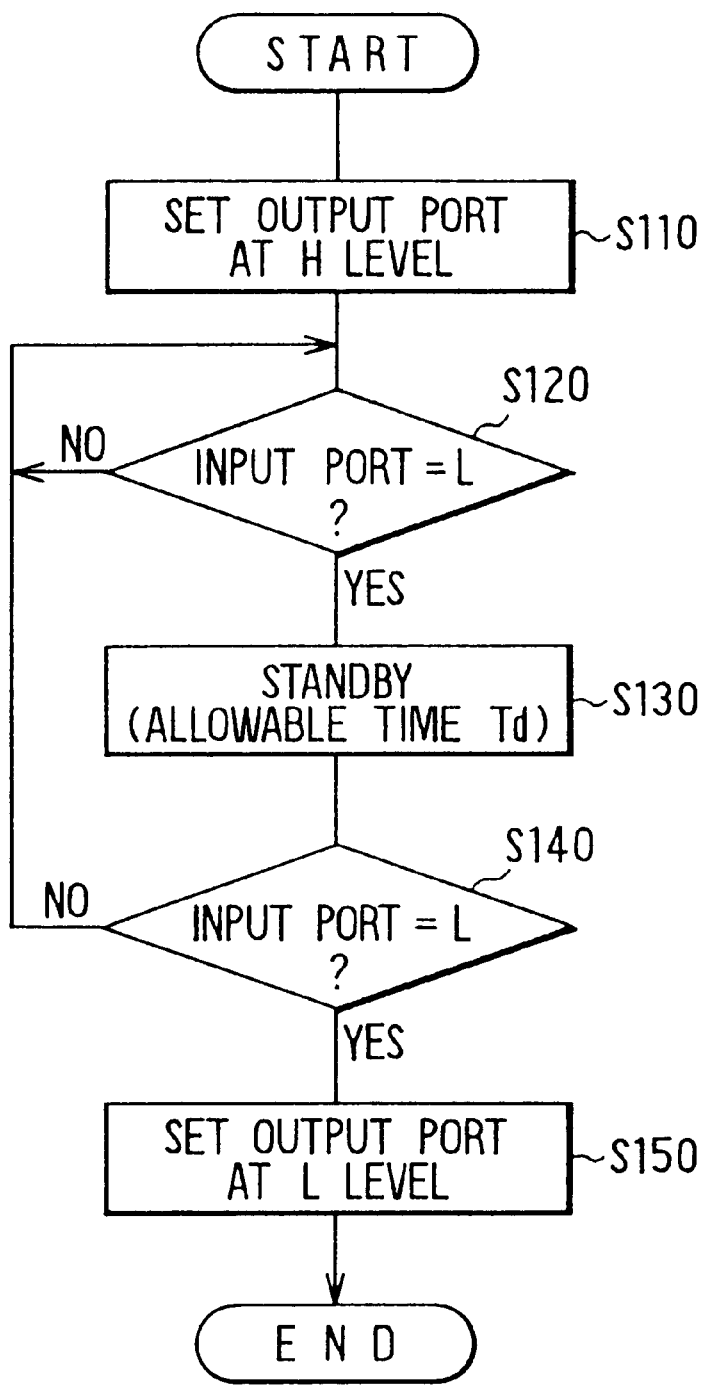
FIG. 5 is a flow diagram showing a processing routine executed by a microcomputer in accordance with the present invention.

Referring now to FIGS. 4 and 5, a third embodiment of the present invention will now be described. The description of this embodiment will be focused on that area which differs from the first and second embodiments, while detailed description of like areas that are indicated by like reference numbers will be omitted.

The first and second embodiments are configured as power supply circuits for use when the disconnection/conduction of a relay RLY connected to a second power supply line +B is directly controlled by an ignition switch IG, and wherein an ECU does not control the driving of the relay RLY. However, the third embodiment of the present invention is configured as a power supply circuit wherein an ECU detects the operational state of an ignition switch IG and controls the driving of a relay RLY in a manner that depends on the detected state.

As shown in FIG. 4, a connector C of an ECU incorporating a power supply circuit 2b according to the present embodiment includes, in addition to the above-described terminals T1–T4, a detection terminal T5 connected to a battery BT through an ignition switch IG, and a driving terminal T6 connected to the battery BT through an exciter coil of a relay RLY.

Like the power supply circuits 2, 2a of the first and second embodiments, the power supply circuit 2b of the present embodiment includes a first power supply line BATT connected to a power supply terminal T1 of the connector C, a second power supply line +B connected to a power supply terminal T2, and a ground line G connected to ground terminals T3, T4. The circuit also includes a constant voltage circuit 10 and an auxiliary constant voltage circuit 30 connected to the first power supply line BATT, a primary constant voltage circuit 20 connected to the second power supply line +B, and a diode 4 connected between the first and second power supply lines BATT, +B.

The power supply circuit 2b of the present embodiment has the following configuration wherein the halt control circuits 40, 40a of the first and second embodiments are replaced. Specifically, the power supply circuit 2b of the present embodiment includes a low-pass filter 60 formed by resistors r1, r2 and a capacitor c1 and connected to the detection terminal T5. A microcomputer 70 receives the output of the low-pass filter 60 at an input port IN through a resistor 66. An OR circuit 62 is formed by a pair of diodes d1, d2 whose cathodes are commonly connected for generating a drive signal SD which is at a high level when at least one of the output of the low-pass filter 60 and the output of an output port OUT is at a high level. An NPN type transistor 64 is connected to the driving terminal T6 at the collector and to the ground line G at the emitter for driving the exciter coil of the relay RLY based on the drive signal SD applied to the base through a resistor 68.

The drive signal SD is also applied to an enable terminal e of a constant voltage control IC 34 that constitutes the auxiliary constant voltage circuit 30 through a resistor 67 as an enable signal $EN_s$. Although not shown, the microcomputer 70 is connected such that it is supplied with power from a third power supply line DL.

In the power supply circuit 2b having such a configuration, the output of the low-pass filter 60 is at a low level when the ignition switch IG is off and is at a high level when the same is on and is taken into the microcomputer 70 through the input port IN.

When the drive signal SD is at a low level, i.e., when both of the output of the low-pass filter 60 and the output from the output port OUT are at a low level, the transistor 64 is turned off to disconnect the relay RLY, thereby disabling the supply of power from the battery BT to the second power supply line +B. Thus, since the primary constant voltage circuit 20 is halted and the enable signal ENS also goes to a disable level, the auxiliary constant voltage circuit 30 is also halted. As a result, no power is supplied to the third power supply line DL.

On the contrary, when the drive signal SD is at a high level, i.e., when at least either the output of the low-pass filter 60 and the output from the output port OUT is at a high level, the transistor 64 is turned on to put the relay RLY in a conducting state. The conducting state allows power to be supplied from the battery BT to the second power supply line +B to cause the primary constant voltage circuit 20 to operate and to cause the enable signal $EN_S$ to be generated at a high ENABLE level. As a result, the auxiliary constant voltage circuit 30 also is turned on. Thus, the primary constant voltage circuit 20 and the auxiliary constant voltage circuit 30 supply power to the third power supply line DL.

A process of setting the output port OUT carried out by the microcomputer 70 will now be described with reference to the flow diagram shown in FIG. 5. This process is initiated when the ignition switch IG is turned on to start the supply of power to the microcomputer 70 through the third power supply line DL.

As shown in FIG. 5, when the process is initiated, the output port OUT is set at a high level at S110. At subsequent S120, it is determined whether the level of the signal at the input port IN is at a low level or not. If the determination is NO, S120 is repeated, thereby placing the process in a standby state. If the determination at S120 is YES, after waiting for a preset allowable time Td (2 ms in the present embodiment) at subsequent S130, it is determined at S140 whether the level of the signal at the input port IN is at a low level as at S120.

If the determination at S140 is NO, the process returns to S120, and the above-described steps are repeated. If the determination is YES, the process proceeds to S150 and is terminated after the output port OUT is set at a low level.

That is, since the initiation of this process indicates that the ignition switch IG has been closed, the drive signal SD is reliably maintained at a high level by setting the output port OUT at a high level (S110). As a result, even if instantaneous interruption occurs thereafter on a control line connected to the connector terminal T5 due to chattering of the ignition switch IG or poor contact at the connector terminal T5, the relay RLY is prevented from changing to the disconnected state immediately after the instantaneous interruption.

The level of the signal at the input port IN is maintained at a high level by the action of the low-pass filter 60 if the instantaneous interruption is short enough. However, if the instantaneous interruption is somewhat longer, the level of the signal at the input port IN temporarily goes to a low level because the effect of the same can not be eliminated by the low-pass filter 60. The level of the signal at the input port IN is also at a low level when the ignition switch IG is intentionally opened.

When it is detected that the level of the signal at input port IN is at a low level (S120-YES), as it is therefore necessary to check whether the low signal results from the opening of the ignition switch IG or due to instantaneous interruption on the control line, such a check is made by determining whether the level of the signal at the input port IN remains at the low level after an allowable time Td passes (S130, S140).

Specifically, if the signal remains at a low level after the allowable time Td passes, it is determined that the ignition switch IG has been opened rather than being instantaneously interrupted, the output port OUT is returned to a low level (S150), and the drive signal SD is set at a low level to stop the supply of power from the battery BT to the second power supply line +B. As a result, the operation of the primary constant voltage circuit 20 and auxiliary constant voltage circuit 30 is halted, and the supply of power to the third power supply line DL is thus stopped.

As described above, the power supply circuit 2b of the present embodiment is similar to the first embodiment in that when the supply of power from the battery BT to the second power supply line +B is interrupted to halt the operation of the primary constant voltage circuit 20, the third power supply line DL is supplied with power from the auxiliary constant voltage circuit 30 connected to the first power supply line BATT only during the allowable time Td. Therefore, the same effect as that of the first embodiment can be achieved.

Especially, in the power supply circuit 2b of the present embodiment, since the allowable time Td is set by a program in the microcomputer 70, the setting of the allowable time Td can be easily and appropriately changed depending on the environment in which it is utilized.

While a signal generated by ORing the output of the low-pass filter 60 and the output from the output port OUT is commonly used as a drive signal SD and an enable signal $EN_s$ in the present embodiment, a configuration may be utilized wherein the drive signal SD and enable signal $EN_s$ are provided as separate signals by using the output of the low-pass filter 60 as the drive signal SD to the transistor 64, and the output of the output port OUT as the enable signal ENs to the constant voltage control IC 34.

Further, while a first power supply line BATT is always supplied with power from the battery BT and second power supply line +B is supplied with power through the relay RLY in the above-described first through third embodiments, an auxiliary constant voltage circuit similar to the auxiliary constant voltage circuit 30 may alternatively be connected to each of a plurality of power supply lines to supply power to the third power supply line DL through all of the supply lines. In this case, it is preferable to set the output voltages of the auxiliary constant voltage circuit lower than the output voltage of the primary constant voltage circuit 20 and slightly varied from each other.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A power supply circuit comprising:
   a first power supply line continuously supplied with power;
   a second power supply line supplied with power when a power supply switch is closed;
   a primary constant voltage circuit connected to the second power supply line for supplying power to a third power supply line at a preset constant primary voltage;
   an auxiliary constant voltage circuit connected to the first power supply line for supplying power to the third power supply line at a constant auxiliary voltage set lower than the primary voltage; and
   a halt control circuit for halting operation of the auxiliary constant voltage circuit when the power supplied to the second power supply line is interrupted for a period equal to or longer than a preset allowable time.

2. The power supply circuit according to claim 1, wherein the halt control circuit comprises:
   a charging device charged by power supplied by the second power supply line; and
   an enable signal generator for discharging the charging device at a discharge current lower than a charge current, and for outputting an operation enable signal if a charging voltage of the charging device is equal to or greater than a preset lower limit voltage, the auxiliary constant voltage circuit operating only while the operation enable signal from the enable signal generator is being input thereto.

3. The power supply circuit according to claim 1, further comprising a plurality of the first power supply lines, and a plurality of auxiliary constant voltage circuits each associated with one of the plurality of the first power supply lines, an auxiliary voltage level of each of the auxiliary constant voltage circuits being set at a different level.

4. The power supply circuit according to claim 3, wherein the switch is opened and closed in response to operation of a vehicle ignition switch.

5. The power supply circuit according to claim 1, wherein the halt control circuit comprises:
   a first transistor connected to the second power supply line and that is turned on when the second power supply line is supplied with power;
   a capacitor connected between the first transistor and the second power supply line that charges when the first transistor is turned on, and that discharges when the power is no longer supplied to the second power supply line to keep the first transistor turned on until a charge of the capacitor falls below a transistor turn-on voltage; and
   a second transistor connected to the first transistor and the auxiliary constant voltage circuit and having an operational state following that of the first transistor for controlling operation of the auxiliary constant voltage circuit.

6. The power supply circuit according to claim 1, wherein the primary and auxiliary constant voltage circuits each comprise an integrated circuit.

7. The power supply circuit according to claim 1, wherein the halt control circuit comprises:
   a capacitor that is charged by the second supply line when the second power supply line is supplied with power; and
   a comparator that is continuously supplied with power from the first power supply line, and that compares a charge voltage of the capacitor with a reference voltage of the primary constant voltage circuit to selectively enable the auxiliary constant voltage circuit.

8. The power supply circuit according to claim 7, wherein the comparator enables the auxiliary constant voltage circuit to supply auxiliary power to the third power supply line when the power supplied to the second power supply line is interrupted for less than the preset allowable time and the capacitor is charged above a predetermined reference voltage level.

9. The power supply circuit according to claim 1, wherein the halt circuit comprises a controller for determining whether a vehicle ignition switch has been closed, and for closing the power supply switch upon determining that the vehicle ignition switch is closed, the controller being programmed to inhibit opening of the power supply switch if an ignition switch input signal is low for less than the preset allowable time period.

10. The power supply circuit according to claim 9, wherein the halt control circuit also includes a low pass filter connected between the ignition switch and the controller and having a low output when the ignition switch is off and a high output when the ignition switch is on.

11. A power supply circuit for an electronic controller comprising:
    a first power supply line constantly supplied with power;
    a second power supply line supplied with power when a power supply switch associated with the second power supply line is closed;
    a control line over which a power supply command is input to instruct whether power is to be supplied by the second power supply line; and
    a switch controller for controlling opening and closing of the power source switch in accordance with the power supply command from the control line;
    a primary constant voltage circuit connected to the second power supply line for supplying power to a third power supply line at a preset constant primary voltage;
    an auxiliary constant voltage circuit connected to the first power supply line for supplying power to the third power supply line at a constant auxiliary voltage set lower than the primary voltage; and
    a halt controller for halting operation of the auxiliary constant voltage circuit only while the power supply command indicates the supply of power has been halted for at least a preset allowable time.

12. The power supply circuit according to claim 11, further comprising a plurality of the first power supply lines and a plurality of the auxiliary constant voltage circuits each for one of the first power supply lines, the auxiliary voltage of each of the auxiliary constant voltage circuits being set to a different level.

13. The power supply circuit according to claim 11, wherein the power supply is a vehicle battery, and the power supply command is input in response to operation of a vehicle ignition switch.

14. A power supply circuit comprising:
    a primary constant voltage circuit, connected to a selectively operated power source, for supplying power to a power supply line at a preset constant primary voltage;
    an auxiliary constant voltage circuit, connected to a continuous power source, for supplying power to the power supply line at a constant auxiliary voltage set lower than the primary voltage; and a halt control circuit for halting operation of the auxiliary constant voltage circuit when the selectively operated power source is interrupted for a period longer than the preset allowable time, the halt control device including an auxiliary constant voltage circuit enabling device that enables the auxiliary constant voltage circuit when the selectively enabled power source is enabled, and a charge storage device that stores a predetermined charge when the selectively enabled power source is enabled, and that maintains operation of the auxiliary constant voltage circuit enabling device for the preset allowable time when operation of the selectively enabled power source is interrupted.

15. The power supply circuit according to claim 14, wherein the auxiliary constant voltage circuit enabling device comprises at least one transistor having an operational state that controls enablement of the auxiliary constant voltage circuit, and the charge storage device comprises a capacitor connected to a base of the at least one transistor.

16. The power supply circuit according to claim 14, wherein the auxiliary constant voltage circuit enabling device comprises a comparator having a LOW input connected to a reference voltage source and a HIGH input connected to the selectively enabled power source, and the charge storage device comprises a capacitor connected between the selectively enabled power source and the HIGH input of the comparator.

17. A power supply circuit according to claim 1, wherein power is supplied to said third power supply line by said auxiliary constant voltage circuit when said preset constant primary voltage from said primary constant voltage circuit is less than said constant auxiliary voltage supplied from said auxiliary constant voltage circuit.

18. A power supply circuit according to claim 4, wherein power is supplied to said third power supply line by said auxiliary constant voltage circuit when said preset constant primary voltage from said primary constant voltage circuit is less than said constant auxiliary voltage supplied from said auxiliary constant voltage circuit.

19. A power supply circuit according to claim 11, wherein power is supplied to said third power supply line by said auxiliary constant voltage circuit when said preset constant primary voltage from said primary constant voltage circuit is less than said constant auxiliary voltage supplied from said auxiliary constant voltage circuit.

20. A power supply circuit comprising:
a first supply line continuously supplied with power;
a second power supply line supplied with power when a power supply switch is closed;
a first constant voltage circuit connected to the second power supply line for supplying power to a third power supply line at a preset constant primary voltage;
a second constant voltage circuit connected to the first power supply line for supplying power to the third power supply line at a constant auxiliary voltage set to be different than the primary voltage; and
a halt control circuit for halting operation of the first and second constant voltage circuits when the power supplied to the second power supply line is interrupted for a period equal to or longer than a preset allowable time.

21. A power supply circuit as in claim 20 wherein said constant auxiliary voltage is lower than said primary voltage and said second constant voltage circuit is halted at a predetermined time after said first constant voltage circuit is halted.

22. A power supply circuit according to claim 21, wherein the halt control circuit comprises:
a charging device charged by power supplied by the second power supply line; and
an enable signal generator for discharging the charging device at a discharge current lower than a charge current, and for outputting an operation enable signal if a charging voltage of the charging device is equal to or greater than a preset lower limit voltage, the second constant voltage circuit operating only while the operation enable signal from the enable signal generator is being input thereto.

23. A power supply circuit according to claim 21, further comprising a plurality of the first power supply lines, and a plurality of second constant voltage circuits each associated with one of the plurality of the first power supply lines, an auxiliary voltage level of each of the second constant voltage circuits being set at a different level.

24. A power supply circuit according to claim 23, wherein the switch is opened and closed in response to operation of a vehicle ignition switch.

25. A power supply circuit according to claim 21 wherein the halt control circuit comprises:
a first transistor connected to the second power supply line and that is turned on when the second power supply line is supplied with power;
a capacitor connected between the first transistor and the second power supply line that charges when the first transistor is turned on, and that discharges when the power is no longer supplied to the second power supply line to keep the first transistor turned on until a charge of the capacitor falls below a transistor turn-on voltage; and
a second transistor connected to the first transistor and the second constant voltage circuit and having an operational state following that of the first transistor for controlling operation of the second constant voltage circuit.

26. A power supply circuit according to claim 21 wherein the first and second constant voltage circuits each comprise an integrated circuit.

27. A power supply circuit according to claim 21 wherein the halt control circuit comprises:
a capacitor that is charged by the second supply line when the second power supply line is supplied with power; and
a comparator that is continuously supplied with power from the first power supply line, and that compares a charge voltage of the capacitor with a reference voltage of the primary constant voltage circuit to selectively enable the second constant voltage circuit.

28. A power supply circuit according to claim 27 wherein the comparator enables the second constant voltage circuit to supply auxiliary power to the third power supply line when the power supplied to the second power supply line is interrupted for less than the preset allowable time and the capacitor is charged above a predetermined reference voltage level.

29. A power supply circuit according to claim 21 wherein the halt circuit comprises a controller for determining whether a vehicle ignition switch has been closed, and for closing the power supply switch upon determining that the vehicle ignition switch is closed, the controller being programmed to inhibit opening of the power supply switch if an ignition switch input signal is low for less than the preset allowable time period.

30. A power supply circuit according to claim 29, wherein the halt control circuit also includes a low pass filter connected between the ignition switch and the controller and having a low output when the ignition switch is off and a high output when the ignition switch is on.

* * * * *